United States Patent [19]

Takita et al.

[11] Patent Number: 4,613,896
[45] Date of Patent: Sep. 23, 1986

[54] METHODS AND APPARATUS FOR AVOIDING MOIRE IN COLOR SCANNERS FOR GRAPHIC ART

[75] Inventors: Nobuhiro Takita, Kyoto; Yosuke Shimamoto, Kusatsu; Hiroichi Tada; Yutaka Tamura, both of Kyoto, all of Japan

[73] Assignee: Dainippon Screen Mfg. Co., Ltd., Kyoto, Japan

[21] Appl. No.: 688,292

[22] Filed: Jan. 2, 1985

[30] Foreign Application Priority Data

Mar. 30, 1984 [JP] Japan ................................. 59-64989
Sep. 5, 1984 [JP] Japan ............................. 59-67565[U]

[51] Int. Cl.⁴ .................................................. G03F 3/10
[52] U.S. Cl. ........................................... 358/76; 358/75
[58] Field of Search ................... 358/55, 75, 76, 224, 358/225, 256, 294

[56] References Cited

U.S. PATENT DOCUMENTS

| | | | |
|---|---|---|---|
| 2,977,407 | 3/1961 | Hirsch | 358/76 |
| 4,189,744 | 2/1980 | Stern | 358/75 |
| 4,271,429 | 2/1981 | Herbst | 358/75 |
| 4,330,797 | 5/1982 | Yokokawa et al. | 358/224 |
| 4,556,901 | 12/1985 | Sakamoto | 358/75 |

*Primary Examiner*—Ronald C. Capossela
*Attorney, Agent, or Firm*—Brumbaugh, Graves, Donohue & Raymond

[57] ABSTRACT

Methods and apparatus for avoiding moire occurring in color scanning for graphic art, wherein light rays from a color original are passed through a pick-up lens, and prior to starting the color scanning, are modulated by means of a low-pass filter, which modulated rays are branched into two optical paths, on one of the paths a lattice plane is provided so as to project the modulated rays thereon, the lattice plane being beforehand selected in accordance with various conditions for scanning. A possible moire on the lattice plane is observed thereby to adjust the low-pass filter by replacement or displacement until the moire disappears on the lattice plane. Finally the light rays from the color original are modulated by the selected low-pass filter.

16 Claims, 10 Drawing Figures

METHODS AND APPARATUS FOR AVOIDING MOIRE IN COLOR SCANNERS FOR GRAPHIC ART

BACKGROUND OF THE INVENTION

1. Field of the Invention

The present invention relates to methods and apparatus for avoiding the occurrence of moire in color scanners for graphic art.

2. Description of the Prior Art

It is known that when a color separation film is produced by a color scanner, unwanted moire patterns (hereinbelow referred to merely as moire) are produced. The causes are presumably as follows:

(1) Interference between light patterns of the pattern images and of the screen net;

(2) Interference between light patterns of the pattern images and the scanning lines; and/or (3) Interference between light patterns of the patterns in the color original and those provided by apertures on the pick-up of the scanner.

The unwanted moire appears particularly when the color original contains repeated pattern designs, such as fabric texture and arranged bricks in buildings, wherein it appears as color diffusion in the form of new patterns not present in the original.

A color separation film having moire must be discarded as a defective product, which leads to an economic loss.

In order to avoid the occurrence of moire in color scanning, one solution is to change the diameters of the apertures of the pick-up in accordance with the mode of representation of the patterns in the color original. Another solution is to image out of focus deliberately so as to scan the images within an allowable limit for out-of-focus.

However, these solutions require experience and skill for the operator, and are not suitable for the inexperienced operators. In addition, a stabilized color separation film is difficult to obtain. Furthermore, it is impossible to avoid the occurrence of moire beforehand, thereby allowing moire to appear on the film.

OBJECTS AND SUMMARY OF THE INVENTION

The present invention is directed toward solving the problem of moire pointed out above, and has for its object to provide methods and apparatus for eliminating the possibility of moire beforehand in color scanning by providing a low-pass filter in the optical system of the pick-up of a color scanner so as to modulate light from the color original.

Another object of the present invention is to provide methods and apparatus for conducting color scanning by a simplified, trouble-free procedure, with the use of a single low-pass filter adjustable in response to an intentional out-of-focus.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to one aspect of the present invention there is provided a method for avoiding moire occurring in color scanners for graphic art, the method comprising: modulating light rays from the color original through a pick-up lens by means of a low-pass filter, prior to starting the color scanning; projecting the modulated rays on a lattice plane; adjusting the low-pass filter through observation of the moire appearing on the lattice plane until the moire disappears thereon; and obtaining signals for recording the picture by light rays from the color original through the adjusted low-pass filter.

According to another aspect of the present invention there is provided an apparatus for avoiding moire occurring in color scanners for graphic art, the apparatus comprising: a low-pass filter interposed between a pick-up lens and an aperture, the low-pass filter being adjustable by replacement or displacement; a light branching lens for branching off the light rays from the low-pass filter into two optical paths; and a lattice plane located in a first one of the optical paths, and a plurality of light receivers in a second path in a number corresponding to that of the apertures and spectrofilters.

DETAILED DESCRIPTION OF THE DRAWINGS

Figure 1:
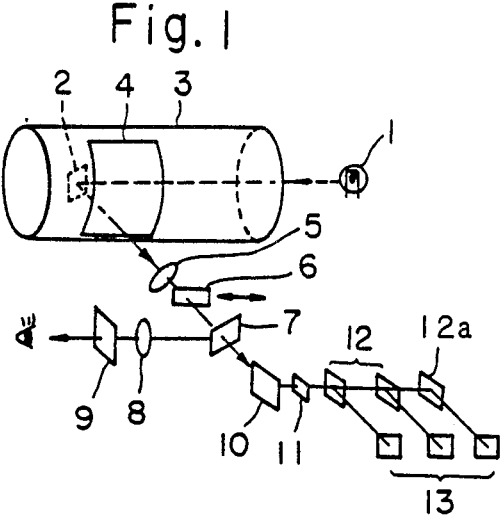
FIG. 1 is a schematic view showing an apparatus for avoiding moire in color scanners embodying the present invention.

Referring to FIG. 1 light rays emitted from a source 1 are reflected on a mirror 2 virtually at 90°, and after having passed through a transparent color original 4 placed around a transparent drum 3 in a very minute area (e.g., 1 mm in diameter), they are branched into two paths by a branching mirror 7 via a pick-up lens 5 and a low-pass filter 6. There is provided a restricting lens 8 on one of the paths, so as to reduce the size of the picture which is magnified e.g. 10 times by the pick-up lens 5. However, the provision of the restricting lens 8 is optional, and not necessarily needed. But it is desirable when the picture is observed with naked eyes. In addition, a lattice plane 9 is provided on the same path, so as to allow the picture projected thereon to be observed with naked eyes to see if moire appears.

On the other path there are provided an inverted mirror 10, an aperture 11, two dichroic mirrors 12, a total reflection mirror 12a, and three photoelectric converters 13 corresponding to the mirrors 12 and 12a, so as to obtain color separation scanned picture signal from the color original 4.

Figure 2:
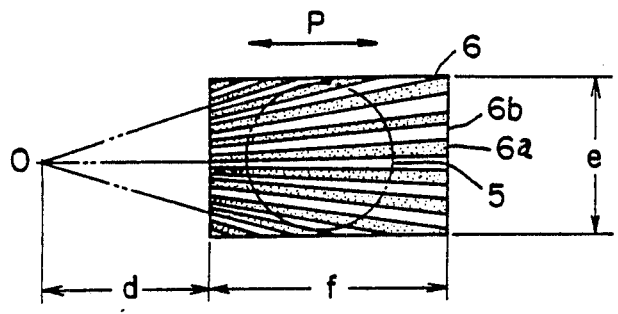
FIG. 2 is a plan view showing an example of a low-pass filter adapted for use in the present invention.

FIG. 2 shows a preferred example of the low-pass filter 6, which will be described in greater detail:

The low-pass filter 6 has transparent parts 6b and diffusing parts 6a, which are radially and alternately arranged to constitute the entity of the low-pass filter 6. The filter 6 is displaceable with respect to the pick-up lens 5 as indicated by the arrows in FIG. 2. The direction of displacement is not limited to this, but it may be moved in all directions relative to the pick-up lens 5. By displacing the low-pass filter 6 the angular pitches of the transparent parts 6b and the diffusing parts 6a are varied. As a result, an out-of-focus is deliberately brought about without preparing many filters.

The transparent parts 6b and the diffusing parts 6a are radially converged toward a point 0, wherein it is arranged that the total area occupied by the diffusing parts 6a is equal to half of that of the entire surface of the filter 6. The diffusing parts 6a are made of a substance which allows light rays to diffuse more widely than those passing through the transparent parts 6b. Black silver particles are used for the diffusing parts 6a. It is desirable to make the diffusing parts 6a from a light transmissible substance rather than a light absorbent one.

Figure 9:
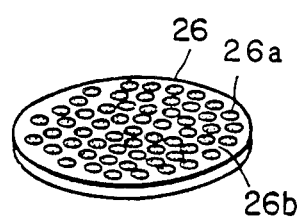
FIG. 9 is a perspective view showing another example of a low-pass filter.

Instead of the diffusing parts 6a, a filter having photomodulation parts formed by vapor-filming can be used. A typical example is illustrated in FIG. 9, which will be described below:

A low-pass filter 26 has a number of vapor-filmed parts 26a whose diameters are the same. The film is made of magnesium fluoride, and the body of the filter is made of transparent glass. The material for the film is not limited to magnesium fluoride. The total area occupied by the vapor-filmed parts 26a is approximately equal to one-half the entire area of the face.

Figure 10:
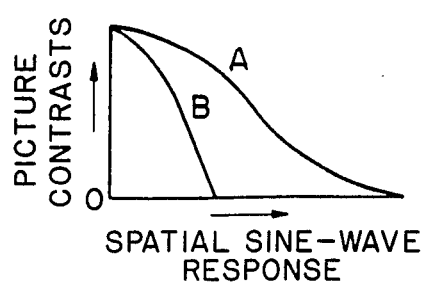
FIG. 10 is a graph showing the action of the low-pass filter shown in FIG. 9.

When this low-pass filter 26 is located in front of or at the back of a camera for making a print, the same effects result as when the diaphragm of the camera is withdrawn up to the size of the vapor-filmed parts 26a. As a result, the picture becomes out of focus. This is because the phase of the light rays passing through the vapor-filmed parts 26a differs from that of those passing through non-filmed parts 26b. This is evident from FIG. 10, which shows that the high frequency components of the spaces existing in the picture are cut. The graph (A) is obtained when a camera lens alone is employed whereas the graph (B) is obtained when the filter 26 is located in front of or at the back of the camera. The graphs show the contrast of the picture. For example, when the original consists of net-like patterns, it is possible to avoid moire by making the meshes out of focus deliberately when the original is photographed.

Another possibility is that the diffusing parts 26a are made of a substance having a highly diffusing ability, such as black silver particles. Owing to the high diffusion of light rays on the diffusing parts the frequencies are differentiated. This filter can be effectively used as a low-pass filter.

In the above-mentioned low-pass filters the more reduced the diameter of the diffusing parts 16a is, the more apparent the out-of-focus becomes. Therefore, it is necessary to prepare filters having various diameters so as to meet desired degrees of out-of-focus.

Figure 3:
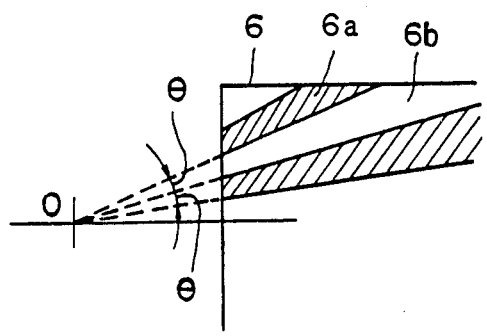
FIG. 3 is a plan view on a larger scale showing angular pitches of radial patterns in the low-pass filter shown in FIG. 2.

Again referring to FIG. 2, the d indicates the distance between the left-hand terminating edge of the filter 6 and the point of conversion 0; now, suppose that it is 15 mm. The vertical side and the horizontal side of the filter 6 are e and f, respectively; now, suppose that the e is 15 mm and the f is 90 mm. In addition, the angular pitch between the transparent part 6b and the diffusing part 6a is $\theta$; now, suppose that it is 0.15°, as shown in FIG. 3. Under this arrangement it is possible to change the pitches therebetween in a range of about 50 microns to 300 microns.

The dimensions are not limited to those referred to above. Likewise, the areas of the transparent parts and the diffusing parts can be variously changed in accordance with the optical quality of the picture to be copied. For example, if the high frequency components in all the frequencies with respect to the spaces existing the picture are to be cut, it is necessary to increase the area of the diffusing parts 6a, and if the reverse is wanted, it is necessary to reduce the area of the diffusing parts 6a against that of the transparent parts 6b.

Again, referring to FIG. 9, it is desirable to arrange such that the diameter of the diffusing parts 26a is reduced to about $\frac{1}{2}$ to $\frac{1}{4}$ of that of the pick-up aperture 11. An experiment assured that when the scanning pitch of the scanner was 127 microns (200 lines/inch), the aperture has a square having a side of 1.5 mm and the diameter of the diffusing part 26a was about 0.3 mm, moire was effectively avoided.

Referring to FIG. 1, the light rays from the color original 4 are modulated by the low-pass filter 6 or 26 after having passed through the pick-up lens 5. Then the modulated rays are branched off by the branching mirror 7 into two optical paths, on one of which they are projected on the lattice plane 9 directly or through the restricting lens 8.

Figure 4:
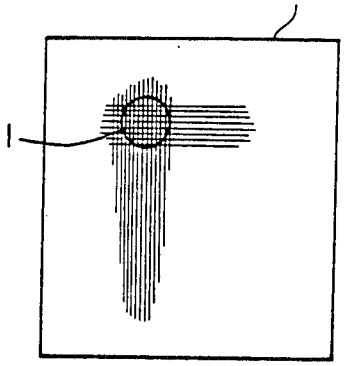
FIG. 4 is a plan view of the lattice plane shown in FIG. 1.
Figure 5:
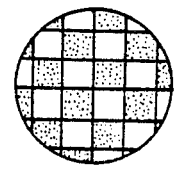
FIG. 5 is fragmentary view on a larger scale of the part indicated by (I) in FIG. 4.

The lattice plane 9 is illustrated on a larger scale in FIGS. 4 and 5. The pitches between the lattice bars are selectively decided in accordance with the shapes of the aperture 11, the pitches of the scanning lines, and the dot-to-dot pitches in the original picture. For this purpose a number of low-pass filters having various pitches are prepared beforehand.

As described above, moire occurs for various reasons, as follows:

(1) The combination of the repeated patterns in the color original 4, and the aperture on the main optical path;

(2) The combination of the repeated patterns and the scanning lines; and (3) The combination of the repeated patterns and the dot-to-dot pitches in the original picture. An experiment conducted by the inventor indicates that the mode of moire resulting from the above-mentioned reasons is very similar to that resulting from the combination of the repeated patterns in the original and a lattice plane having a particular lattice pitch. This demonstration teaches the following suggestions:

The lattice plane 9 having a required lattice pitch is selected by taking into consideration the repeated patterns contained in the original picture, the aperture 11 to be used, the dot-to-dot pitches in the original, the scanning line pitches, and the expected magnification of the picture to be scanned. Through observation of the moire occurring between the picture projected on the selected lattice plane 9 and the lattice bars thereof, the low-pass filter 6 or 26 is adjusted so as to cancel the moire. The picture recording signals are obtained by light rays passing through this adjusted filter, wherein the light rays are passed through the color original 4 and modulated by the adjusted filter.

As a preferred example, (1) the dot-to-dot pitches and the pitches of the repeated patterns are 145 microns (corresponding to a screen having 175 lines/inch); (2) the aperture 11 is 1.5 mm×1.5 mm, and the repeated patterns in the original picture have a pitch of 1.5 mm, or (3) the scanning pitch and the pitch of the repeated patterns in the original picture are either 72 microns to 64 microns. In this example, a low-pass filter having a pitch ranging from 70 microns 140 microns effectively used. It is of course necessary to change the pattern pitch of the low-pass filter if the magnification of the picture is varied. The patterns on the lattice plane 9 can be of any form, provided that the meshes are individually formed by squares drawn by thin lines.

Figure 6:
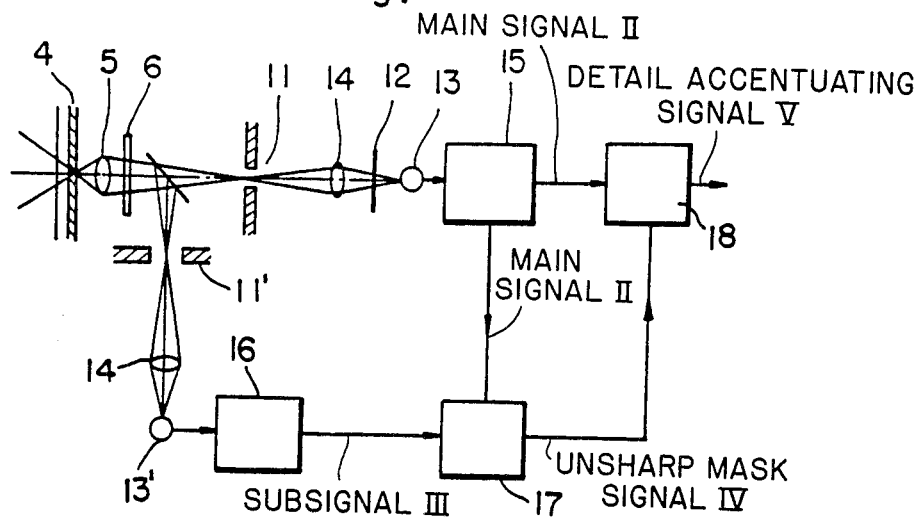
FIG. 6 is an explanatory view of a principle of a detail accentuater in a color scanner.
Figure 7:
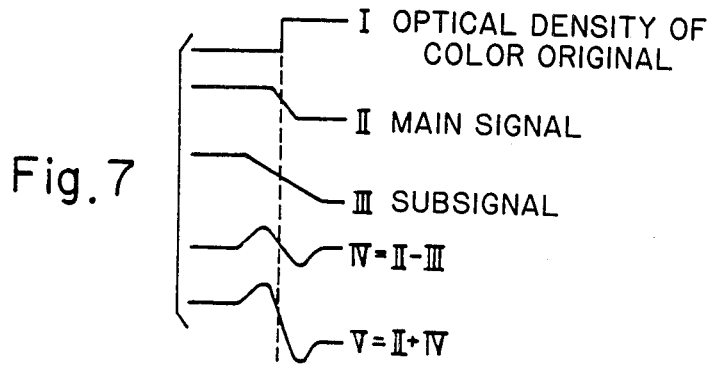
FIG. 7 is an explanatory view showing the outputs of the detail accentuater of FIG. 6.
Figure 8:
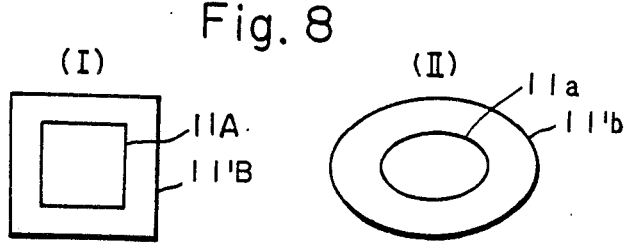
FIG. 8 (I) and (II) are schematic views showing the shapes of a main aperture and a subaperture.

Referring to FIGS. 6, 7 and 8, the aperture 11 will be described in greater detail:

A luminous flux is passed through or reflected on a color original 4 at a point therein, and branched into two fluxes or paths via the pick-up lens 5 and the low-pass filter 6. The main flux passes through the main aperture 11, which corresponds to the picture elements in the original 4 to be scanned, the main flux being subjected to photoelectric conversion by a photoelectric photoelectric converter 13. The other flux passes through a subaperture 11', and are likewise subjected to photoelectric conversion. The first-mentioned flux is used to obtain main signals (FIG. 7 (II)), and the secondly mentioned flux to obtain subsignals (FIG. 7 (III)), which correspond to relatively coarse scanning line-to-line spaces and are not suited for reproducing clear pictures because the pictures become out of focus. This is why they are called unsharp signals. The unsharp signals are subtracted from the main signals by a subtracter 17, thereby obtaining unsharp mask signals (FIG. 7 (IV)) representing the details alone, which signals are added to the main signals at a detail accentuater circuit 18. As a result detail accentuating signals are obtained (FIG. 7 (V)). This ensures clear scanned pictures.

FIG. 8 shows the shapes of the main aperture 11 and the subaperture 11', wherein the reference numerals 11a and 11'b indicate a small or restricted ellipse and a large or widened ellipse. The reference numerals 11A and 11'B indicate a small rectangle and a large rectangle. The differences in the shapes of openings affect the effectiveness of avoiding moire. That is, the elliptic shape is more effective than the rectangular one. This is presumably because the elliptic shape requires less exact angular alignment between the scanning directions and the open face of the opening of the aperture than the rectangular one does. The relationship between the major axis and the minor axis of the ellipse is decided in accordance with the ratios of speeds in the main scanning direction and the subscanning direction. The area of the main aperture 11a is equal to about ¼ to 1/10 of that of the subaperture 11'b.

In the embodiments illustrated above a transparent color original 4 is used, but the present invention can be applied to a reflecting color original.

We claim:

1. A method for avoiding the occurrence of moire in color scanners for graphic art, the method comprising:
   modulating light rays from the color original through a pick-up lens by means of a low pass filter, prior to starting the color scanning;
   projecting the modulated rays on a lattice plane;
   adjusting the low-pass filter through observation of the moire appearing on the lattice plane until the moire disappears thereon; and
   obtaining signals for recording the picture on the color original by light rays from the color original through the adjusted low-pass filter.

2. An apparatus for avoiding the occurrence of moire in color scanners for graphic art of the type having a plurality of apertures and spectrofilters, the apparatus comprising:
   an adjustable low-pass filter interposed between a pick-up lens and an aperture;
   a light branching lens for branching off light rays from the low-pass filter into first and second optical paths;
   a lattice plane located in the first optical path; and
   a plurality of light receivers in the second optical path in a number corresponding to the number of the apertures and spectrofilters.

3. An apparatus as set forth in claim 2, further comprising a restricting lens located ahead of the lattice plane.

4. An apparatus as set forth in claim 2 or 3, wherein the low-pass filter has at least several vapor-filmed parts located widely on one face thereof, the total area of the vapor-filled parts being approximately equal to half the entire area of the face on which they are located, and the vapor-filmed parts having an optical characteristic such that the light rays passing therethrough are differentiated by half waves from those passing through the non-vapor-filmed parts of said one face.

5. An apparatus as set forth in claim 4, wherein the aperture is elliptical.

6. An apparatus as set forth in claim 2 or 3, wherein the low-pass filter has at least several diffusing parts located widely on one face thereof, the diffusing parts allowing light rays passing therethrough to diffuse more widely than those passing through the parts of said one face not having diffusing parts located thereon.

7. An apparatus as set forth in claim 6, wherein the aperture is elliptical.

8. An apparatus as set forth in claim 2 or 3, wherein the low-pass filter has transparent parts and light modulating parts arranged alternately as well as convergently toward one point in a radial manner.

9. An apparatus as set forth in claim 8, wherein the total area of the light modulating parts is approximately equal to half of the entire area of the face on which both parts are provided.

10. An apparatus as set forth in claim 9, wherein the light modulating parts are made vapor-filming.

11. An apparatus as set forth in claim 9, wherein the light modulating parts are made of a light diffusing substance.

12. An apparatus as set forth in claim 8, wherein the light modulating parts are made by vapor-filming.

13. An apparatus as set forth in claim 8, wherein the light modulating parts are made of a light diffusing substance.

14. An apparatus as set forth in claim 2 or 3, wherein the aperture is elliptical.

15. An apparatus as set forth in claim 2 wherein the low pass filter is adjustable by replacement.

16. An apparatus as set forth in claim 2 wherein the low pass filter is adustable by altering its displacement with respect to the aperture.

* * * * *